(12) United States Patent
Ishizaki et al.

(10) Patent No.: US 11,788,905 B2
(45) Date of Patent: Oct. 17, 2023

(54) CAPACITANCE SENSOR

(71) Applicants: HONDA MOTOR CO., LTD., Tokyo (JP); The University of British Columbia, Vancouver (CA)

(72) Inventors: Ryusuke Ishizaki, Wako (JP); Mirza Saquib Sarwar, Vancouver (CA); John D. W. Madden, Vancouver (CA)

(73) Assignees: Honda Motor Co., Ltd., Tokyo (JP); The University of British Columbia, Vancouver (CA)

( * ) Notice: Subject to any disclaimer, the term of this patent is extended or adjusted under 35 U.S.C. 154(b) by 43 days.

(21) Appl. No.: 17/565,741

(22) Filed: Dec. 30, 2021

(65) Prior Publication Data

US 2022/0214232 A1 Jul. 7, 2022

(30) Foreign Application Priority Data

Jan. 5, 2021 (JP) .................................. 2021-000621

(51) Int. Cl.
| | | |
|---|---|---|
| *G01L 1/14* | (2006.01) | |
| *G01L 5/165* | (2020.01) | |
| *G06F 3/044* | (2006.01) | |

(52) U.S. Cl.
CPC .............. *G01L 1/142* (2013.01); *G01L 1/146* (2013.01); *G01L 5/165* (2013.01); *G06F 3/0445* (2019.05); *G06F 3/0447* (2019.05)

(58) Field of Classification Search
CPC ...... G06F 3/044; G06F 3/0445; G06F 3/0446; G06F 3/0447; G01L 1/14; G01L 1/142; G01L 1/144; G01L 1/146; G01L 1/148; G01L 5/165
See application file for complete search history.

(56) References Cited

U.S. PATENT DOCUMENTS 9,222,846 B2 12/2015 Lim et al.
2019/0369832 A1* 12/2019 Sakaue ................ H05K 1/0259

FOREIGN PATENT DOCUMENTS

JP 2014-115282 A 6/2014
WO WO-2022038937 A1 * 2/2022

* cited by examiner

*Primary Examiner* — Herbert K Roberts
(74) *Attorney, Agent, or Firm* — Carrier, Shende & Associates P.C.; Joseph P. Carrier; Jeffrey T. Gedeon

(57) ABSTRACT

A capacitance sensor 1A in which first electrodes 3(1) to 3(4) and a second electrode 4 are arranged on a base material 2 made of a dielectric includes grounded electrostatic shielding members (5(1) to 5(6)). The electrostatic shielding members 5 are arranged, for example, at positions between first wiring portions 6(1)in, 6(2)in, 6(4) in connected to the first electrodes 3(1), 3(2), 3(4) and the second electrode 4, at a position between a second wiring portion 6(5)in connected to the second electrode 4 and the first electrode 3(4), and at a position between the second wiring portion 6(5)in and the first wiring portion 6(4)in.

5 Claims, 4 Drawing Sheets

CAPACITANCE SENSOR

BACKGROUND

Technical Field

The present invention relates to a capacitance sensor.

Related Art

Conventionally, there is known a capacitance sensor having a structure in which an elastically deformable dielectric is interposed between a first electrode and a second electrode constituting a capacitor, for example, as described in JP 2014-115282 A and U.S. Pat. No. 9,222,846 B2. The sensors disclosed in JP 2014-115282 A and U.S. Pat. No. 9,222,846 B2 include a plurality of first electrodes attached to a first substrate and a plurality of second electrodes attached to a second substrate. When a normal force or a shearing force acts on the sensor, the dielectric is deformed. As a result, relative displacement between the first electrodes and the second electrodes occurs, thereby causing a change in capacitance between the first electrodes and the second electrodes. The sensor detects the normal force and the shearing force acting on the sensor based on the change in capacitance.

SUMMARY

In the capacitance sensors as described in JP 2014-115282 A and U.S. Pat. No. 9,222,846 B2, a wiring line is connected to each of the first electrodes and the second electrodes in order to measure the capacitance between the first electrodes and the second electrodes. The capacitance between a first electrode-side wiring line connected to the first electrodes and the second electrodes, or the capacitance between a second electrode-side wiring line connected to the second electrode and the first electrode, or the capacitance between the first electrode-side wiring line and the second electrode-side wiring line, or the combined capacitance thereof may take a capacitance value that cannot be ignored as compared with the capacitance between the first electrodes and the second electrodes that is the capacitance to be measured.

The capacitance between the first electrode-side wiring line and the second electrode, or the capacitance between the second electrode-side wiring line and the first electrode, or the capacitance between the first electrode-side wiring line and the second electrode-side wiring line, or the combined capacitance thereof (hereinafter, these capacitance may be collectively referred to as disturbance capacitance) does not generally take a constant capacitance value but can change according to the elastic deformation of the dielectric between the first electrodes and the second electrodes. Therefore, the disturbance capacitance interfere with improvement of measurement accuracy of the capacitance between the first electrodes and the second electrodes.

The present invention has been made in view of such a background, and an object of the present invention is to provide a capacitance sensor capable of reducing the disturbance capacitance such as capacitance between a first electrode-side wiring line and a second electrode and improving measurement accuracy of the capacitance between the first electrode and the second electrode.

In order to achieve the above object, a capacitance sensor of the present invention includes:

an elastically deformable base material formed of a dielectric;

at least one first electrode arranged in contact with the base material;

at least one second electrode that is in contact with the base material, is arranged to be separated from the first electrode in a thickness direction of the base material in a state where the base material is interposed between the first electrode and the second electrode, and is arranged to have a portion overlapping with the first electrode when viewed in a direction of spacing from the first electrode; and a first electrode-side wiring line and a second electrode-side wiring line connected to the first electrode and the second electrode, respectively, wherein a grounded electrostatic shielding member is arranged in at least one or more of a place between a first wiring portion of the first electrode-side wiring line that moves relative to the second electrode together with the first electrode as the base material elastically deforms and the second electrode, a place between a second wiring portion of the second electrode-side wiring line that moves relative to the first electrode together with the second electrode as the base material elastically deforms and the first wiring portion, and a place between the second wiring portion and the first electrode (first aspect of the present invention).

In the capacitance sensor of the present invention, the grounded electrostatic shielding member is arranged as described above. Therefore, at least one or more capacitance (disturbance capacitance) among the capacitance between the first wiring portion of the first electrode-side wiring line and the second electrode, the capacitance between the second wiring portion of the second electrode-side wiring line and the first wiring portion, and the capacitance between the second wiring portion and the first electrode can be reduced to a sufficiently minute capacitance value as compared with the capacitance between the first electrode and the second electrode.

Therefore, when the capacitance between the first electrode and the second electrode is measured via the first electrode-side wiring line and the second electrode-side wiring line, the measurement accuracy can be improved as compared with the case where no electrostatic shielding member is provided.

In the first aspect of the present invention, it is preferable that the electrostatic shielding member is arranged in a place among the place between the first wiring portion and the second electrode, the place between the second wiring portion and the first wiring portion, the place between the first wiring portion and the second electrode, and the place between the second wiring portion and the first electrode, where the capacitance between the first wiring portion and the second electrode, the capacitance between the second wiring portion and the first wiring portion, and the capacitance between the second wiring portion and the first electrode can be kept within capacitance values equal to or less than a predetermined value (second aspect of the present invention).

Accordingly, the entire disturbance electrostatic capacitance can be reduced to a minute capacitance value. Therefore, the measurement accuracy of the capacitance between the first electrode and the second electrode can be suitably improved.

In the first aspect or the second aspect of the present invention, the electrostatic shielding member may be arranged so as to extend over a plurality of places among the place between the first wiring portion and the second electrode, the place between the second wiring portion and the first wiring portion, the place between the first wiring portion and the second electrode, and the place between the second wiring portion and the first electrode (third aspect of the present invention).

Accordingly, the number of electrostatic shielding members included in the capacitance sensor can be reduced.

In the first to third aspects of the present invention, it is preferable that the electrostatic shielding member is arranged so as not to be present in a place where the first electrode and the second electrode overlap with each other when viewed in the direction of spacing between the first electrode and the second electrode (fourth aspect of the present invention).

Accordingly, it is possible to prevent the electrostatic shielding member from affecting the capacitance between the first electrode and the second electrode.

In the first to fourth aspects, the electrostatic shielding member may be arranged at a position closer to the first electrode in the direction of spacing between the first electrode and the second electrode so as to move relative to the second electrode together with the first electrode as the base material elastically deforms, and is arranged so as to surround a periphery of the first electrode and not to have a portion overlapping with the first electrode when viewed in the direction of spacing between the first electrode and the second electrode (fifth aspect of the present invention).

Alternatively, the electrostatic shielding member may be arranged at a position closer to the second electrode in the direction of spacing between the first electrode and the second electrode so as to move relative to the first electrode together with the second electrode as the base material elastically deforms, and is arranged so as to surround a periphery of the second electrode and not to have a portion overlapping with the second electrode when viewed in the direction of spacing between the first electrode and the second electrode (sixth aspect of the present invention).

According to the fifth and sixth aspects of the present invention, it is possible to appropriately reduce the entire disturbance capacitance to a minute capacitance value and prevent the electrostatic shielding member from affecting the electrostatic capacitance between the first electrode and the second electrode.

DETAILED DESCRIPTION

First Embodiment

Figure 1:
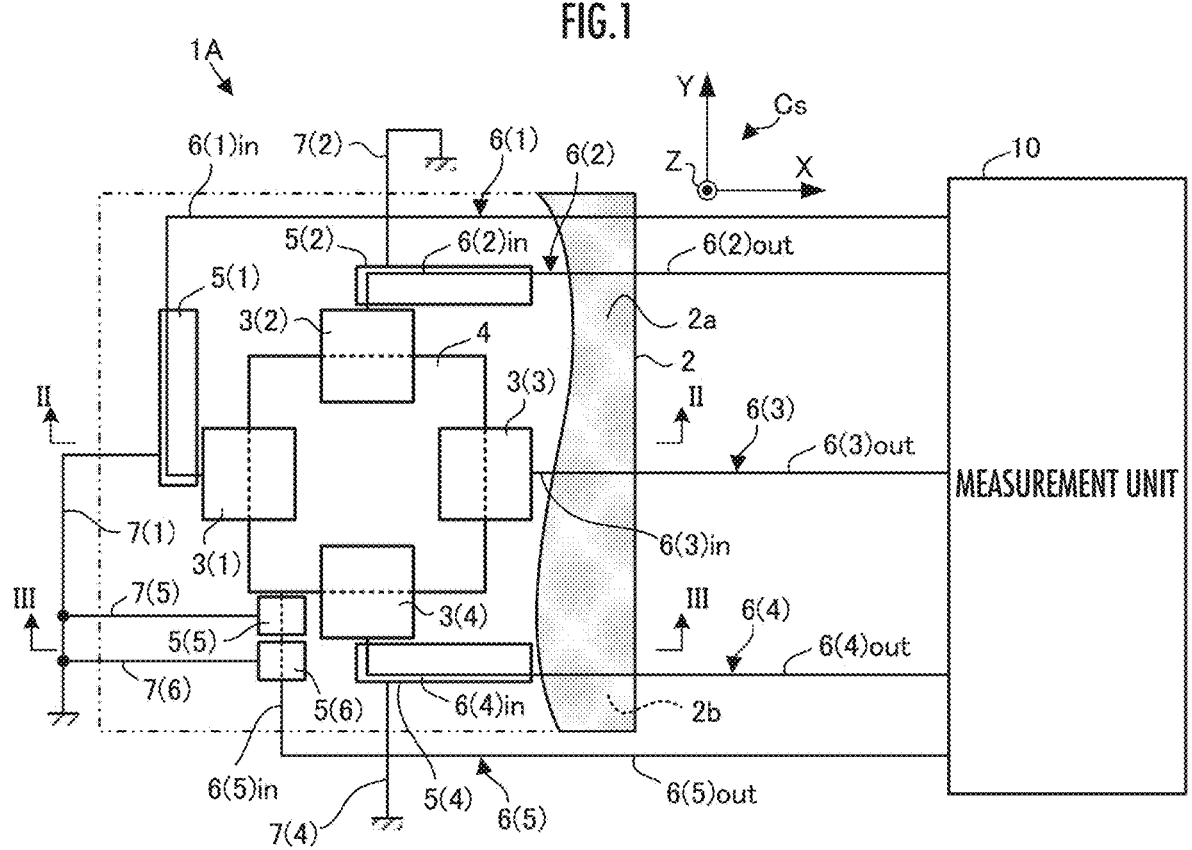
FIG. 1 is a plan view of a capacitance sensor according to a first embodiment and a diagram illustrating a measurement unit connected to the capacitance sensor.
Figure 2:
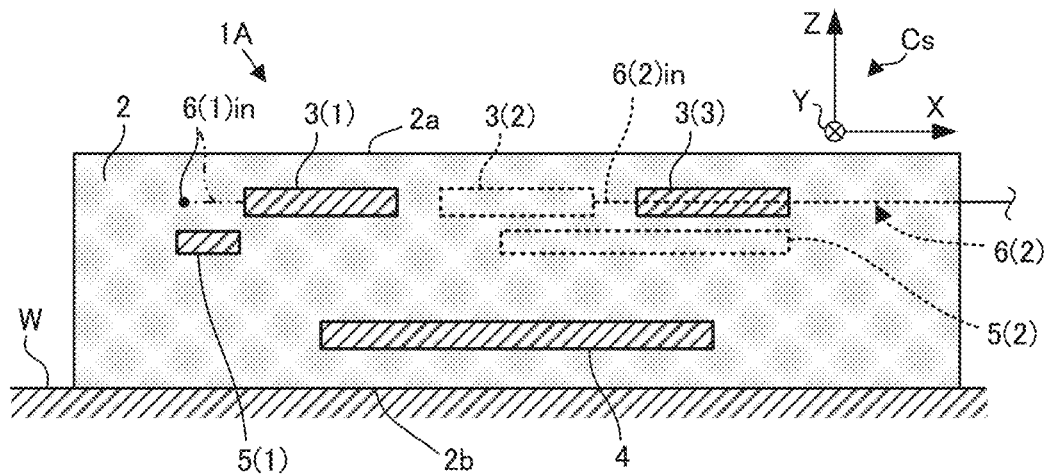
FIG. 2 is a cross-sectional view taken along line II-II in FIG. 1.
Figure 3:
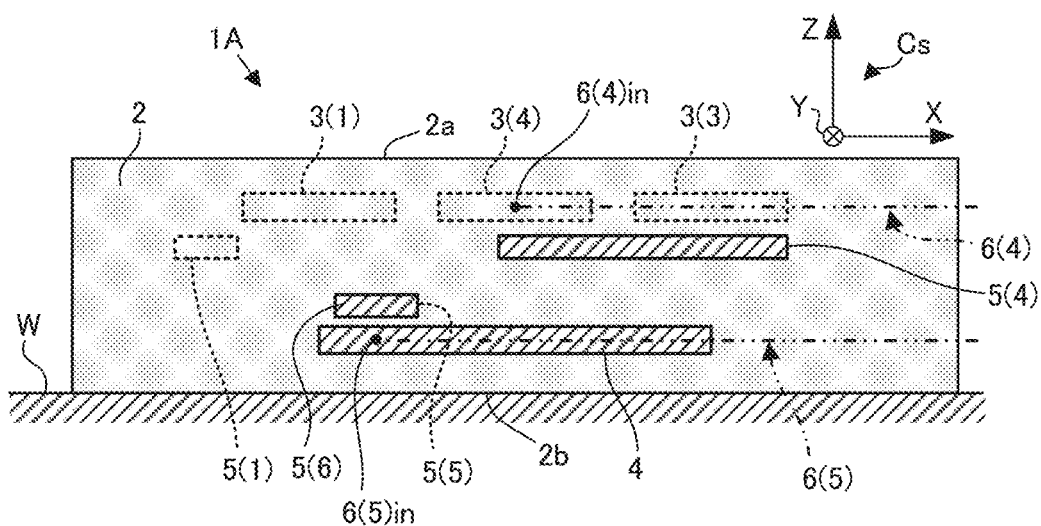
FIG. 3 is a cross-sectional view taken along line in FIG. 1.

A first embodiment of the present invention will be described below with reference to FIGS. 1 to 3. A capacitance sensor 1A (Hereinafter, also simply referred to as the sensor 1A) of the present embodiment includes a base material 2, a first electrode 3 (3(1), 3(2), 3(3), 3(4)), a second electrode 4, an electrostatic shielding member 5 (5(1), 5(2), 5(4), 5(5), 5(6)), and a wiring line 6 (6(1), 6(2), 6(3), 6(4), 6(5)). In FIG. 1, a part of the base material 2 is sketched by dots, and the outer shape of the remaining part is indicated by a two-dot chain line. In FIGS. 2 and 3, the entire base material 2 is sketched by dots.

The base material 2 constitutes a base of the sensor 1A, and is made of an elastically deformable dielectric. For example, the base material 2 can be configured to be elastically deformable by a flexible dielectric including a gel of polyvinyl chloride (PVC), polyvinylidene fluoride (PVDF), polydimethylsiloxane (PDMS), a silicon-based resin, a urethane-based resin, an epoxy-based resin, or a composite material thereof.

In the present embodiment, the base material 2 is formed in a shape having a substantially constant thickness, for example, a rectangular parallelepiped shape. Then, as illustrated in FIGS. 2 and 3, one surface 2b (hereinafter, referred to as a back surface 2b of the base material 2) of two surfaces 2a and 2b in the thickness direction of the base material 2 is fixed to the surface of an arbitrary attachment target object W.

For example, if the sensor 1A is used as a tactile sensor for detecting a contact force or the like, the back surface 2b of the base material 2 can be fixed to the surface of the attachment target object W such as a robot hand. In this case, the other surface 2a (hereinafter, referred to as front surface 2a of the base material 2) of the base material 2 in the thickness direction is a surface to contact an external object.

Each of the first electrode 3, the second electrode 4, and the electrostatic shielding member 5 is made of a conductor. For example, each of the first electrode 3, the second electrode 4, and the electrostatic shielding member 5 may include a conductor made of a metal such as carbon, silver, gold, or a liquid metal, a thiophene-based conductive polymer, a conductive resin such as polystyrene sulfonic acid (PSS), or a composite material thereof.

The sensor 1A includes one or more first electrodes 3 and one or more second electrodes 4. In the present embodiment, the sensor 1A includes, for example, four first electrodes 3(1), 3(2), 3(3), and 3(4) and one second electrode 4.

The second electrode 4 is arranged in a state where at least a part thereof is in contact with the base material 2. Specifically, in the present embodiment, the second electrode 4 is formed in, for example, a rectangular plate shape. As illustrated in FIGS. 2 and 3, the second electrode 4 is embedded in the base material 2 in a posture parallel to the front and back surfaces 2a and 2b of the base material 2 at a position closer to the back surface 2b as seen in the thickness direction of the base material 2. Therefore, the second electrode 4 is arranged in a state where substantially the entire outer surface thereof is in contact with the base material 2. However, of both surfaces of the second electrode 4 as seen in the thickness direction, for example, the whole or a part of the surface facing the back surface 2b of the base material 2 may be exposed to the outside of the base material 2.

In the following description, for convenience, assuming a three-axis orthogonal coordinate system (XYZ coordinate system) Cs in which the thickness direction of the base material 2 is the Z-axis direction as illustrated in FIGS. 1 to 3, the thickness direction of the base material 2 may be referred to as Z-axis direction. With regard to X-axis direction and Y-axis direction of the coordinate system Cs, an extending direction of two sides parallel to each other among four sides of the second electrode 4 viewed in the Z-axis direction (the left-right direction on the plane of FIG. 1) is defined as X-axis direction, and an extending direction of the other two sides (the up-down direction on the plane of FIG. 1) is defined as Y-axis direction.

Each of the four first electrodes 3(1) to 3(4) is disposed being separated from the second electrode 4 in the Z-axis direction (the thickness direction of the base material 2) in a state in which at least a part thereof is in contact with the base material 2 while having the base material 2 interposed between each of the four first electrodes 3(1) to 3(4) and the second electrode 4. Further, each of the first electrodes 3(1) to 3(4) is disposed such that a part of each of the first electrodes 3(1) to 3(4) overlaps with the second electrode 4 when viewed in the Z-axis direction.

Specifically, in the present embodiment, each of the first electrodes 3(1) to 3(4) is formed in, for example, a square plate shape of a predetermined size smaller in area than the second electrode 4. Each of the first electrodes 3(1) to 3(4) is embedded in the base material 2 in a posture parallel to the front and back surfaces 2a and 2b of the base material 2 (posture orthogonal to the Z-axis direction) at a position closer to the front surface 2a of the base material 2 as seen in the Z-axis direction. As a result, each of the first electrodes 3(1) to 3(4) is substantially entirely in contact with the base material 2, and is separated from the second electrode 4 in the Z-axis direction with the base material 2 interposed between the first electrode 3 and the second electrode 4. Therefore, the Z-axis direction can also be said to be a direction of spacing between each of the first electrodes 3(1) to 3(4) and the second electrode 4.

In this case, the first electrodes 3(1) to 3(4) have a constant spacing from the second electrode 4 as seen in the Z-axis direction, and are positioned in the middle parts of the four corresponding sides of the second electrode 4 when viewed in the Z-axis direction from the front surface 2a side of the base material 2. Each of the first electrodes 3(1) to 3(4) is arranged such that two sides parallel to each other among the four sides thereof extend in one axial direction of the X-axis direction and the Y-axis direction and the other two sides extend in the other axial direction when viewed in the Z-axis direction from the front surface 2a side of the base material 2. Each of the first electrodes 3(1) to 3(4) is arranged such that a part thereof overlaps with the second electrode 4 and the remaining part thereof protrudes outward from the second electrode 4 when viewed in the Z-axis direction from the front surface 2a side of the base material 2.

Since the first electrodes 3(1) to 3(4) are embedded in the base material 2 in the present embodiment, almost the entire first electrodes 3(1) to 3(4) are in contact with the base material 2. However, of both surfaces of each of the first electrodes 3(1) to 3(4) as seen in the thickness direction, for example, the whole or a part of the surface facing the front surface 2a of the base material 2 may be exposed to the outside of the base material 2.

Since the first electrodes 3(1) to 3(4) and the second electrode 4 are arranged on the base material 2 as described above, the portion of each of the first electrodes 3(1) to 3(4) overlapping with the second electrode 4 (overlapping portion when viewed in the Z-axis direction) constitutes a capacitor having the base material 2 as a dielectric between the overlapping portions. In this case, the capacitor formed at the overlapping portion of each of the first electrodes 3(1) to 3(4) with the second electrode 4 has capacitance corresponding to the area of the overlapping portion and the spacing between the overlapping portions (spacing as seen in the Z-axis direction).

When a shear force acts on the base material 2 in the X-axis direction, the base material 2 is elastically deformed such that the first electrodes 3(1) to 3(4) are displaced in the X-axis direction relative to the second electrode 4 according to the magnitude of the shear force. Therefore, among the first electrodes 3(1) to 3(4), the area of the portion, overlapping with the second electrode 4, of each of the two first electrodes 3(1) and 3(3) aligned in the X-axis direction changes. Accordingly, the capacitance between each of the first electrodes 3(1), 3(3) and the second electrode 4 changes. At this time, since the area of the portion, overlapping with the second electrode 4, of each of the two first electrodes 3(2) and 3(4) aligned in the Y-axis direction does not change, the capacitance between each of the first electrodes 3(2), 3(4) and the second electrode 4 is kept substantially constant.

When a shear force acts on the base material 2 in the Y-axis direction, the base material 2 is elastically deformed such that the first electrodes 3(1) to 3(4) are displaced in the Y-axis direction relative to the second electrode 4 according to the magnitude of the shear force. Therefore, the area of the portion of each of the two first electrodes 3(2), 3(4) aligned in the Y-axis direction among the first electrodes 3(1) to 3(4) overlapping with the second electrode 4 changes. Accordingly, the capacitance between each of the first electrodes 3(2), 3(4) and the second electrode 4 changes. At this time, since the area of the overlapping portions of each of the two first electrodes 3(1), 3(3) aligned in the X-axis direction with the second electrode 4 does not change, the capacitance between each of the first electrodes 3(1), 3(3) and the second electrode 4 is kept substantially constant.

When a load (compressive force or tensile force) in the Z-axis direction acts on the base material 2, the base material 2 is elastically deformed such that the first electrodes 3(1) to 3(4) are displaced in the Z-axis direction relative to the second electrode 4 according to the magnitude of the load. Therefore, the spacing between the overlapping portions of the first electrodes 3(1) to 3(4) with the second electrode 4 as seen in the Z-axis direction changes. Accordingly, the capacitance between each of the first electrodes 3(1) to 3(4) and the second electrode 4 changes.

As described above, the electrostatic capacitance of the portion of each of the first electrodes 3(1) to 3(4) overlapping with the second electrode 4 changes according to the elastic deformation of the base material 2 caused by the shear force applied in two axial directions of the X-axis direction and the Y-axis direction or the load applied in the Z-axis direction. Therefore, by measuring these capacitance, it is possible to measure the amount of elastic deformation (stress strain) of the base material 2, the shearing force acting on the base material 2 in the two axial directions (the X-axis direction and the Y-axis direction), or the load applied in the Z-axis direction, from the measurement values of the capacitance.

In order to perform the measurement, the wiring line 6 included in the sensor 1A includes wiring lines 6(1) to 6(4) respectively connected to the first electrodes 3(1) to 3(4) so as to be electrically conductive, and a wiring line 6(5) connected to the second electrode 4 so as to be electrically conductive. These wiring lines 6(1) to 6(5) are formed of conductors similar to those of the first electrodes 3(1) to 3(4) and the second electrode 4, respectively. The wiring lines 6(1) to 6(5) are extended from the respective first electrodes 3(1) to 3(4) and second electrode 4 to the outside of the base material 2 through the inside of the base material 2 in appropriate wiring patterns.

In this case, the portions of the wiring lines 6(1) to 6(5) inside the base material 2 are disposed so as not to pass through the places between each of the first electrodes 3(1) to 3(4) and the second electrode 4. The material of the wiring lines 6(1) to 6(5) may be the same as or different from the material of the first electrodes 3(1) to 3(4) and the second electrode 4. In each of the wiring lines 6(1) to 6(5), the portion inside the base material 2 and the portion outside the base material 2 may be made of conductors of different materials. All or a part of the portion outside the base material 2 of each of the wiring lines 6(1) to 6(5) may be, for example, a wiring line formed on a circuit board. In the following description, portions of the wiring lines 6(1) to 6(5) inside the base material 2 will be referred to as internal wiring lines 6(1)in to 6(5)in, and portions of the wiring lines 6(1) to 6(5) outside the base material 2 will be referred to as external wiring lines 6(1)out to 6(5)out.

The internal wiring lines 6(1)in to 6(4)in of the wiring lines 6(1) to 6(4) are portions that move relative to the second electrode 4 together with the first electrodes 3(1) to 3(4) to which the internal wiring lines 6(1)in to 6(4)in are respectively connected when the base material 2 deforms elastically. The internal wiring line 6(5)in of the wiring line 6(5) is a portion that moves relative to the first electrodes 3(1) to 3(4) together with the second electrode 4 when the base material 2 deforms elastically.

In the present embodiment, the internal wiring lines 6(1)in to 6(4)in respectively connected to the first electrodes 3(1) to 3(4) are disposed at substantially the same Z-axis direction positions as the Z-axis direction positions of the first electrodes 3(1) to 3(4), and the internal wiring line 6(5)in connected to the second electrode 4 is disposed at substantially the same Z-axis direction position as the Z-axis direction position of the second electrode 4. However, each of the internal wiring lines 6(1)in to 6(5)in may be disposed so as to change its position in the Z-axis direction.

Additionally, in the present embodiment, the wiring lines 6(1) to 6(4) respectively connected to the first electrodes 3(1) to 3(4) correspond to first electrode-side wiring lines in the present invention, and the internal wiring lines 6(1)in to 6(4)in of the wiring lines 6(1) to 6(4) correspond to first wiring portions in the present invention. The wiring line 6(5) connected to the second electrode 4 corresponds to a second electrode-side wiring line in the present invention, and the internal wiring line 6(5)in of the wiring line 6(5) corresponds to a second wiring portion in the present invention.

The external wiring lines 6(1)out to 6(5)out led to the outside of the base material 2 are connected to a measurement unit 10 capable of measuring electrostatic capacitance between each of the first electrodes 3(1) to 3(4) and the second electrode 4. The measurement unit 10 includes a power supply circuit, a processor such as a microcomputer, a memory (RAM, ROM, etc.), an interface circuit, and the like which are not illustrated. The measurement unit 10 is configured to apply a measurement voltage between each of the first electrodes 3(1) to 3(4) and the second electrode 4 by any known method for measuring capacitance, and generate a detection signal according to the capacitance between each of the first electrodes 3(1) to 3(4) and the second electrode 4 at the time of applying the voltage, and measure the capacitance from the detection signal. The measurement unit 10 can also estimate the amount of elastic deformation (stress strain) generated in the base material 2 and the external force acting on the base material 2 (shear force and load applied in the Z-axis direction) from the measurement value of the capacitance between each of the first electrodes 3(1) to 3(4) and the second electrode 4. Such a configuration of the measurement unit 10 may be a known configuration.

The electrostatic shielding members 5 are formed of conductors similar to those of the first electrodes 3(1) to 3(4) and second electrode 4. In this case, the material of the electrostatic shielding member 5 may be the same as or different from the material of the first electrodes 3(1) to 3(4) and the second electrode 4.

In order to enhance the measurement accuracy of the capacitance between each of the first electrodes 3(1) to 3(4) and the second electrode 4, the electrostatic shielding members 5 are arranged on the base material 2 and are grounded in grounding places outside the base material 2 so as to be capable of keeping, at sufficiently small capacitance values (z 0) equal to or less than a predetermined threshold, disturbance capacitance of the capacitance between each of the internal wiring lines 6(1)in to 6(4)in of the wiring lines 6(1) to 6(4) respectively connected to the first electrodes 3(1) to 3(4) and the second electrode 4, the capacitance between each of the internal wiring lines 6(1)in to 6(4)in and the internal wiring line 6(5)in of the wiring line 6(5) connected to the second electrode 4, and the capacitance between the internal wiring line 6(5)in and each of the first electrodes 3(1) to 3(4). The predetermined threshold indicates a capacitance value sufficiently smaller than the capacitance between each of the first electrodes 3(1) to 3(4) and the second electrode 4.

In the present embodiment, the internal wiring lines 6(1)in to 6(5)in of the wiring lines 6(1) to 6(5) are disposed in a wiring pattern as illustrated in FIG. 1, for example. In this case, in particular, there is a possibility that the capacitance between each of the internal wiring lines 6(1)in, 6(2)in, 6(4)in having their respective portions facing one side of the second electrode 4 in a direction perpendicular to the one side and extending in substantially the same direction as the one side and the second electrode 4, the capacitance between the internal wiring line 6(5)in having a portion facing one side of the first electrode 3(4) in a direction perpendicular to the one side and extending in substantially the same direction as the one side and the first electrode 3(4), and the capacitance between the internal wiring line 6(4)in and the internal wiring line 6(5)in having their respective portions facing each other and extending in substantially parallel with each other may have capacitance values exceeding the above-described threshold.

Therefore, in the present embodiment, the electrostatic shielding member 5 included in the sensor 1A includes three electrostatic shielding members 5(1), 5(2), and 5(4) for shielding lines of electric force between the internal wiring lines 6(1)in, 6(2)in, and 6(4)in and the second electrode 4, respectively, an electrostatic shielding member 5(5) for shielding a line of electric force between the internal wiring line 6(5)in and the first electrode 3(4), and an electrostatic shielding member 5(6) for shielding a line of electric force between the internal wiring line 6(4)in and the internal wiring line 6(5)in.

Specifically, in the present embodiment, each of the electrostatic shielding members 5(1) to 5(6) is formed in, for example, a square plate shape. The electrostatic shielding members 5(1), 5(2), and 5(4) are respectively arranged in places between the internal wiring lines 6(1)in, 6(2)in, and 6(4)in and the second electrode 4 in a posture parallel to the front and back surfaces 2a and 2b of the base material 2. The electrostatic shielding member 5(5) is arranged in a place between the internal wiring line 6(5)in and the first electrode 3(4) in a posture parallel to the front and back surfaces 2a and 2b of the base material 2. The electrostatic shielding member 5(6) is arranged in a place between the internal wiring line 6(4)in and the internal wiring line 6(5)in in a posture parallel to the front and back surfaces 2a and 2b of the base material 2.

More specifically, for example, the electrostatic shielding members 5(1), 5(2), and 5(4) are arranged inside the base material 2 so as to block the path of the lines of electric force between the corresponding internal wiring lines 6(1)in, 6(2)in, and 6(4)in and the second electrode 4 by bringing their respective Z-axis direction positions close to the respective Z-axis direction positions of the corresponding internal wiring lines 6(1)in, 6(2)in, and 6(4)in. Each of the electrostatic shielding members 5(1), 5(2) and 5(4) is arranged so as not to be present in a place where each of the first electrodes 3(1) to 3(4) overlaps with the second electrode 4 when viewed in the Z-axis direction. The electrostatic shielding members 5(1), 5(2), and 5(4) are grounded in grounding places outside the base material 2 via corresponding grounding wiring lines 7(1), 7(2), and 7(4) connected thereto so as to be electrically conductive.

In this case, since the Z-axis direction positions of the electrostatic shielding members 5(1), 5(2), and 5(4) are close to the Z-axis direction positions of the corresponding internal wiring lines 6(1)in, 6(2)in, and 6(4)in, even if the base material 2 is elastically deformed by an external force such as a shearing force, the electrostatic shielding members 5(1), 5(2), and 5(4) move relative to the second electrode 4 substantially integrally with the corresponding internal wiring lines 6(1)in, 6(2)in, and 6(4)in. This appropriately achieves the electrostatic shielding between each of the internal wiring lines 6(1)in, 6(2)in, and 6(4)in and the second electrode 4, regardless of the elastic deformation of the base material 2 due to the external force.

The electrostatic shielding members 5(4) and 5(5) are arranged inside the base material 2 so as to block the paths of the lines of electric force between the internal wiring line 6(5)in and the corresponding first electrode 3(4) and the internal wiring line 6(4)in by bringing the Z-axis direction positions of the electrostatic shielding members 5(4) and 5(5) close to the Z-axis direction position of the internal wiring line 6(5)in. Each of the electrostatic shielding members 5(5) and 5(6) is arranged so as not to be present in a place where each of the first electrodes 3(1) to 3(4) overlaps with the second electrode 4 when viewed in the Z-axis direction. The electrostatic shielding members 5(5) and 5(6) are grounded in grounding places outside the base material 2 via corresponding grounding wiring lines 7(5) and 7(6) connected thereto so as to be electrically conductive.

In this case, since the Z-axis direction positions of the electrostatic shielding members 5(4) and 5(5) are close to the Z-axis direction position of the internal wiring line 6(5)in, even if the base material 2 is elastically deformed by an external force such as a shearing force, the electrostatic shielding members 5(4) and 5(5) move relative to the first electrode 3(4) and the internal wiring line 6(4)in substantially integrally with the internal wiring line 6(5)in. Therefore, the electrostatic shielding between the internal wiring line 6(5)in and each of the first electrode 3(4) and the internal wiring line 6(4)in can be appropriately realized regardless of the elastic deformation of the base material 2 due to the external force.

The grounding wiring lines 7(1) to 7(6) connected to the electrostatic shielding members 5(1) to 5(6), respectively, are drawn out to the outside of the base material 2 through the inside of the base material 2, and are connected in grounding places outside the base material 2. In this case, the portions of the grounding wiring lines 7(1) to 7(5) inside the base material 2 are disposed so as not to pass through the places between each of the first electrodes 3(1) to 3(4) and the second electrode 4. The material of the grounding wiring lines 7(1) to 7(5) may be the same as or different from the material of the first electrodes 3(1) to 3(4) and the second electrode 4. In each of the grounding wiring lines 7(1) to 7(5), the portion inside the base material 2 and the portion outside the base material 2 may be made of conductors of different materials. All or a part of the portion outside the base material 2 of each of the grounding wiring lines 7(1) to 7(5) may be, for example, a wiring line formed on a circuit board.

The sensor 1A of the present embodiment is configured as described above. As a method of fabricating the sensor 1A thus configured, for example, a method of laminating a plurality of sheets made of the same material as the base material 2 can be adopted. In this case, on the layer sheets where the first electrodes 3(1) to 3(4), the second electrode 4, and the electrostatic shielding members 5(1) to 5(6) are to be arranged, the first electrodes 3(1) to 3(4), the second electrode 4, the electrostatic shielding members 5(1) to 5(6), and the wiring lines (the wiring lines 6(1) to 6(5) or the grounding wiring lines 7(1) to 7(6)) connected thereto can be mounted by printing or the like.

According to the sensor 1A of the present embodiment, the electrostatic shielding members 5(1) to 5(6) are arranged as described above. Therefore, the capacitance between each of the internal wiring lines 6(1)in, 6(2)in, and 6(4)in connected to the first electrodes 3(1), 3(2), and 3(4) and the second electrode 4, the capacitance between the internal wiring line 6(5)in connected to the second electrode 4 and the first electrode 3(4), and the capacitance between the internal wiring line 6(4)in connected to the first electrode 3(4) and the internal wiring line 6(5)in connected to the second electrode 4 can be maintained at sufficiently minute capacitance values ($\approx 0$) smaller than the predetermined threshold value by the electrostatic shielding members 5(1) to 5(6) regardless of the elastic deformation of the base material 2.

Each of the electrostatic shielding members 5(1) to 5(6) is arranged so as not to be present in a place where each of the first electrodes 3(1) to 3(4) overlaps with the second electrode 4 when viewed in the Z-axis direction. Therefore, the electrostatic shielding members 5(1) to 5(6) are prevented from affecting the capacitance between each of the first electrodes 3(1) to 3(4) and the second electrode 4.

The capacitance between the internal wiring line 6(3)in connected to the first electrode 3(3) and the second electrode 4, the capacitance between the internal wiring line 6(5)in connected to the second electrode 4 and each of the first electrodes 3(1), 3(2), and 3(3), and the capacitance between the internal wiring lines 6(1)in, 6(2)in, 6(3)in respectively connected to the first electrodes 3(1), 3(2), and 3(3) and the internal wiring line 6(5)in connected to the second electrode 4 are originally kept at sufficiently minute capacitance values ($\approx 0$) smaller than the predetermined threshold even if the corresponding electrostatic shielding members are not provided.

Therefore, the capacitance between each of the first electrodes 3(1) to 3(4) and the second electrode 4 can be accurately measured by the measurement unit 10. As a result, the amount of elastic deformation of the base material 2 due to an external force (shear force, load applied in Z-axis direction) acting on the base material 2 and the external force can be accurately measured from the measurement values of the capacitance.

In the sensor 1A described above, among the electrostatic shielding members 5(1) to 5(6), ones close to each other may be integrated. For example, the electrostatic shielding members 5(5) and 5(6) may be integrated. In this case, the electrostatic shielding member in which the electrostatic shielding members 5(5) and 5(6) are integrated is arranged across a place between the internal wiring line 6(5)in and the first electrode 3(4) and a place between the internal wiring line 6(5)in and the internal wiring line 6(4)in.

In the present embodiment, the sensor 1A does not include an electrostatic shielding member between the internal wiring line 6(3)in and the second electrode 4, an electrostatic shielding member between the internal wiring line 6(5)in and each of the first electrodes 3(1), 3(2), and 3(3), and an electrostatic shielding member between each of the internal wiring lines 6(1)in, 6(2)in, and 6(3)in and the internal wiring line 6(5)in. However, the sensor 1A may include these electrostatic shielding members.

In this case, for example, the electrostatic shielding member 5(5) between the internal wiring line 6(5)in and the first electrode 3(4) or the electrostatic shielding member 5 between the internal wiring line 6(5)in and the internal wiring line 6(4) can be arranged so as to also serve as electrostatic shielding between the internal wiring line 6(5) in and each of one or more of the first electrodes 3(1), 3(2), and 3(3) or electrostatic shielding between the internal wiring line 6(5)in and each of one or more of the internal wiring lines 6(1)in, 6(2)in, and 6(3)in.

In the sensor 1A of the present embodiment, the electrostatic shielding members 5(1), 5(2), and 5(4) are arranged at the Z-axis direction positions close to the Z-axis direction positions of the internal wiring lines 6(1)in, 6(2)in, and 6(4)in, respectively. However, each or any of the electrostatic shielding members 5(1), 5(2), and 5(4) may be arranged at a Z-axis direction position close to the Z-axis direction position of the second electrode 4.

In the sensor 1A of the present embodiment, the electrostatic shielding members 5(5) and 5(6) are arranged at the Z-axis direction positions close to the Z-axis direction position of the internal wiring line 6(5)in. However, for example, the electrostatic shielding member 5(5) may be arranged at a Z-axis direction position close to the Z-axis direction position of the first electrode 3(4). Further, the electrostatic shielding member 5(6) may be arranged at a Z-axis direction position close to the Z-axis direction position of the internal wiring line 6(4)in.

Second Embodiment

Figure 4:
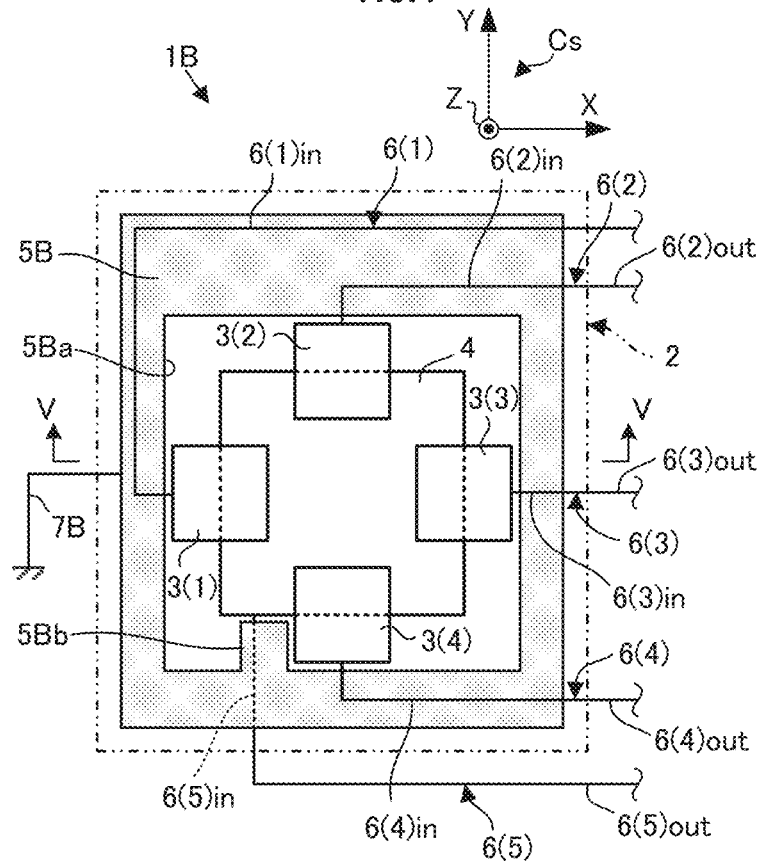
FIG. 4 is a plan view of a capacitance sensor according to a second embodiment.
Figure 5:
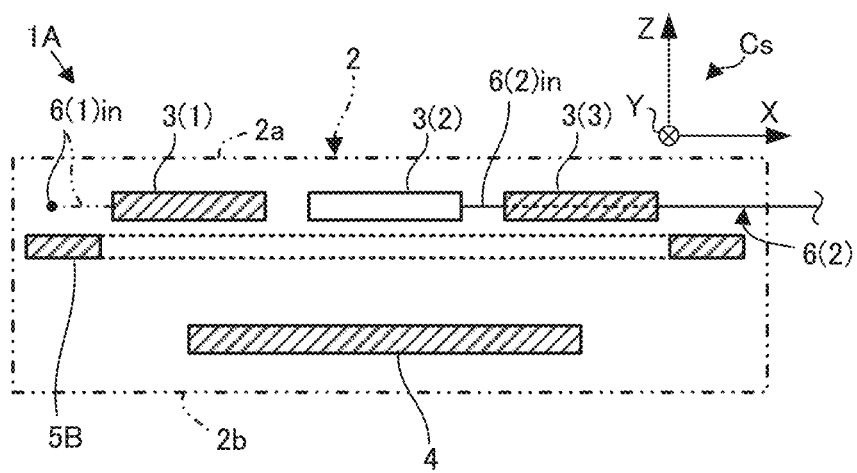
FIG. 5 is a cross-sectional view taken along line V-V in FIG. 4.

Next, a second embodiment of the present invention will be described with reference to FIGS. 4 and 5. A capacitance sensor 1B (hereinafter, also simply referred to as the sensor 1B) of the present embodiment includes a base material 2, a first electrode 3 (3(1), 3(2), 3(3), 3(4)), a second electrode 4, an electrostatic shielding member 5B, and a wiring line 6 (6(1), 6(2), 6(3), 6(4), 6(5)). The base material 2, the first electrode 3, the second electrode 4, and the wiring line 6 are the same as those of the sensor 1A of the first embodiment. The wiring line 6 is connected to a measurement unit 10 (not illustrated) as in the first embodiment. Therefore, description of these configurations is omitted. In FIG. 4, the electrostatic shielding member 5B is sketched by dots for convenience.

In the present embodiment, the electrostatic shielding member 5B is configured as a single member made of a conductor similar to those of the first electrode 3 and the second electrode 4. The material of the electrostatic shielding member 5B may be the same as or different from the material of the first electrode 3 and second electrode 4.

In the present embodiment, the electrostatic shielding member 5B is formed in a frame plate shape, for example, a square frame plate shape having an opening hole 5Ba penetrating in the thickness direction in the center. As illustrated in FIG. 5, the electrostatic shielding member 5B is arranged inside the base material 2 in a posture parallel to the front and back surfaces 2a and 2b of the base material 2 (posture orthogonal to the Z-axis direction) at a Z-axis direction position close to the Z-axis direction positions of the first electrodes 3(1) to 3(4) and the internal wiring lines 6(1)in to 6(4)in between the first electrodes 3(1) to 3(4) and the second electrode 4. Further, the electrostatic shielding member 5B is grounded in a grounding place outside the base material 2 via a grounding wiring line 7B.

More specifically, the electrostatic shielding member 5B is arranged such that the entire first electrodes 3(1) to 3(4) are accommodated inside the opening hole 5Ba when viewed in the Z-axis direction. Therefore, the electrostatic shielding member 5B is arranged so as to surround the entire periphery of the first electrodes 3(1) to 3(4) and not to have a portion overlapping with each of the first electrodes 3(1) to 3(4) when viewed in the Z-axis direction.

More specifically, for example, the opening hole 5Ba is formed in a substantially square shape when viewed in the Z-axis direction. When viewed in the Z-axis direction, the electrostatic shielding member 5B is arranged such that two sides parallel to each other of the four sides of the opening hole 5Ba and the other two sides extend in the X-axis direction and the Y-axis direction, respectively, the first electrodes 3(2) and 3(4) aligned in the Y-axis direction are positioned within the space between the two sides of the opening hole 5Ba extending in the X-axis direction, and the first electrodes 3(1) and 3(3) aligned in the X-axis direction are positioned within the space between the two sides of the opening hole 5Ba extending in the Y-axis direction.

The size of the opening hole 5Ba of the electrostatic shielding member 5B is set such that the entire first electrodes 3(1) to 3(4) are accommodated inside the opening hole 5Ba when viewed in the Z-axis direction, and in a state where the electrostatic shielding member 5B is arranged as described above, a side facing the first electrode 3(2) of two sides extending in the X-axis direction is close to one side (upper side in FIG. 3) of the first electrode 3(2), and a side facing the first electrode 3(4) is close to one side (lower side in FIG. 3) of the first electrode 3(4), a side facing the first electrode 3(1) of the two sides extending in the Y-axis direction is close to one side (left side in FIG. 3) of the first electrode 3(1), and a side facing the first electrode 3(3) is close to one side (right side in FIG. 3) of the first electrode 3(3).

As illustrated in FIG. 4, a portion around the opening hole 5Ba of the electrostatic shielding member 5B (square frame plate-like portion) is arranged so as to overlap substantially with the entire internal wiring lines 6(1)in to 6(4)in connected to the first electrodes 3(1) to 3(4), respectively, when viewed in the Z-axis direction.

In the present embodiment, the electrostatic shielding member 5B integrally includes a protrusion 5Bb for electrostatic shielding between the first electrode 3(4) and the internal wiring line 6(5) connected to the second electrode 4. The protrusion 5Bb protrudes in the Y-axis direction from an inner periphery of the opening hole 5Ba (a side close to the first electrode 3(4) among the four sides of the opening hole 5Ba) toward a place between the first electrode 3(4) and the internal wiring line 6(5), and is arranged so as to be close to a side (a left side in FIG. 3) of the first electrode 3(4) facing the internal wiring line 6(5) when viewed in the Z-axis direction.

Since the electrostatic shielding member 5B (including the protrusion 5Bb) is arranged at the Z-axis direction position close to the Z-axis direction positions of the first electrodes 3(1) to 3(4) and the internal wiring lines 6(1)in to 6(4)in, even if the base material 2 is elastically deformed by an external force such as a shear force, the electrostatic shielding member 5B moves relative to the second electrode 4 and the internal wiring lines 6(5)in connected thereto substantially integrally with the first electrodes 3(1) to 3(4) and the internal wiring lines 6(1)in to 6(4)in.

Therefore, the electrostatic shielding between each of the internal wiring lines 6(1)in to 6(4)in and each of the second electrode 4 and the internal wiring line 6(5)in can be appropriately realized by the electrostatic shielding member 5B regardless of the elastic deformation of the base material 2 due to the external force. In addition, the electrostatic shielding between the internal wiring line 6(5)in and the first electrode 3(4) can be appropriately realized by the protrusion 5Bb of the electrostatic shielding member 5B.

The grounding wiring line 7B connected to the electrostatic shielding member 5B is formed of a conductor in the same form as the grounding wiring lines 7 (7(1) to 7(6)) of the first embodiment. The grounding wiring line 7B is drawn out from the outer periphery of the electrostatic shielding member 5B to the outside of the base material 2 through the inside of the base material 2 (the inside of the periphery of the electrostatic shielding member 5B), and is connected to a grounding place outside the base material 2.

For example, the electrostatic shielding member 5B may be arranged such that the whole or a part of its outer periphery is exposed to the outside of the base material 2. The grounding wiring line 7B may extend from a portion of the electrostatic shielding member 5B exposed to the outside of the base material 2 without passing through the inside of the base material 2.

The sensor 1B of the present embodiment is configured as described above. The sensor 1B thus configured can be fabricated, for example, by a method similar to the fabrication method described for the sensor 1A of the first embodiment.

According to the sensor 1B of the present embodiment, the electrostatic shielding member 5B is arranged as described above. Therefore, the capacitance between each of the internal wiring lines 6(1)in to 6(4)in respectively connected to the first electrodes 3(1) to 3(4) and each of the second electrode 4 and the internal wiring line 6(5)in connected thereto and the capacitance between the internal wiring line 6(5)in connected to the second electrode 4 and the first electrode 3(4) can be maintained at sufficiently minute capacitance values ($\approx 0$) smaller than the predetermined threshold value by the electrostatic shielding member 5B regardless of the elastic deformation of the base material 2.

The electrostatic shielding member 5B is arranged so as not to be present in a place where each of the first electrodes 3(1) to 3(4) overlaps with the second electrode 4 when viewed in the Z-axis direction, so that the electrostatic shielding member 5B is prevented from affecting the electrostatic capacitance between each of the first electrodes 3(1) to 3(4) and the second electrode 4.

The capacitance between the internal wiring lines 6(1)in, 6(2)in, 6(3)in respectively connected to the first electrodes 3(1), 3(2), and 3(3) and the internal wiring line 6(5)in connected to the second electrode 4 are kept at sufficiently minute capacitance values ($\approx 0$) smaller than the predetermined threshold, as with the sensor 1A of the first embodiment, even if the corresponding electrostatic shielding members are not provided.

Therefore, according to the sensor 1B, similarly to the sensor 1A of the first embodiment, the capacitance between each of the first electrodes 3(1) to 3(4) and the second electrode 4 can be accurately measured by the measurement unit 10. As a result, the amount of elastic deformation of the base material 2 due to an external force (shear force, load applied in Z-axis direction) acting on the base material 2 and the external force can be accurately measured from the measurement values of the capacitance.

In the sensor 1B described above, the electrostatic capacitance between the internal wiring line 6(3)in connected to the first electrode 3(3) and each of the second electrode 4 and the internal wiring line 6(5) connected thereto is sufficiently minute ($\approx 0$). Therefore, the electrostatic shielding member 5B may be, for example, a member that does not include a portion extending in the Y-axis direction close to the first electrode 3(3). The electrostatic shielding member 5B may be divided into, for example, a plurality of portions.

Third Embodiment

Figure 6:
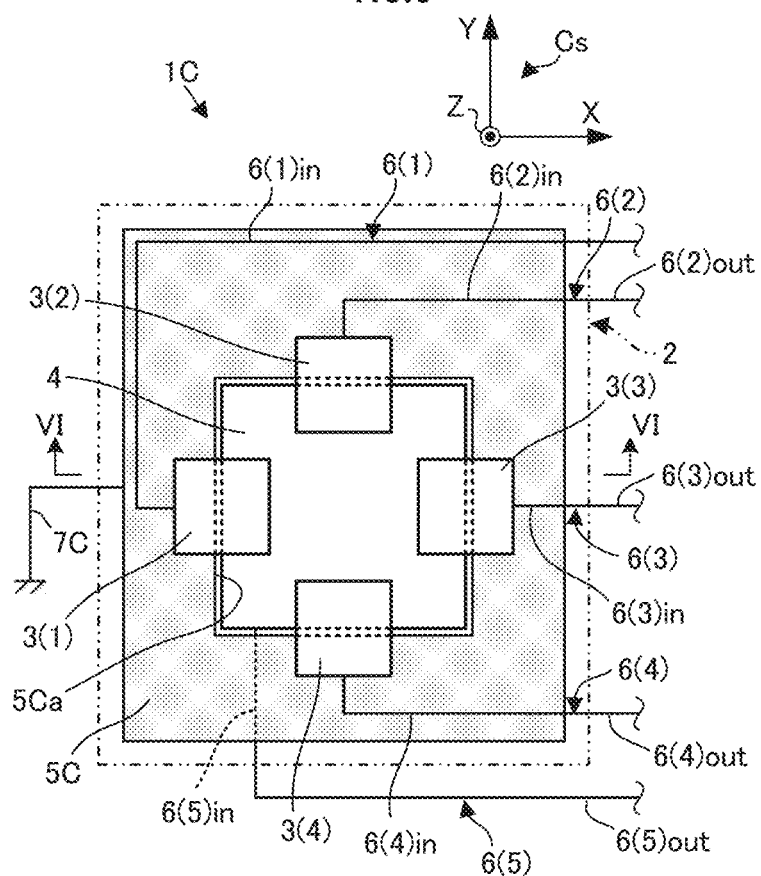
FIG. 6 is a plan view of a capacitance sensor according to a third embodiment.
Figure 7:
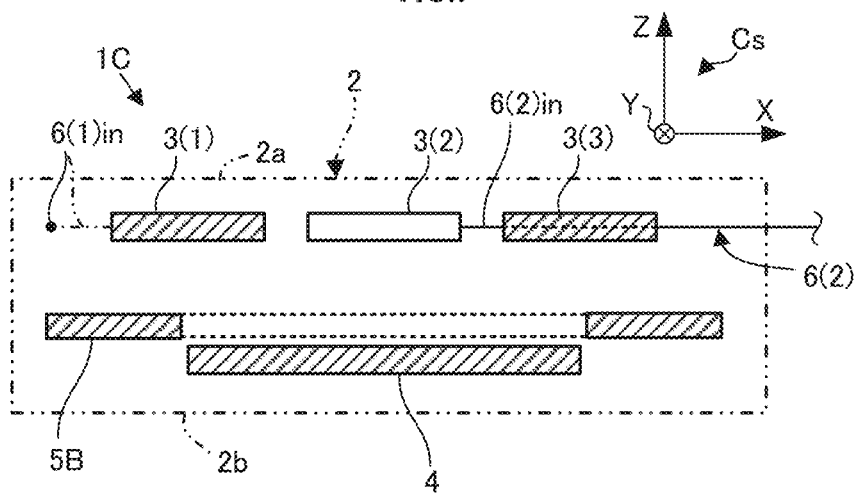
FIG. 7 is a cross-sectional view taken along line VI-VI in FIG. 6.

Next, a third embodiment of the present invention will be described with reference to FIGS. 6 and 7. A capacitance sensor 1C (hereinafter, also simply referred to as the sensor 1C) of the present embodiment includes a base material 2, a first electrode 3 (3(1), 3(2), 3(3), 3(4)), a second electrode 4, an electrostatic shielding member 5C, and a wiring line 6 (6(1), 6(2), 6(3), 6(4), 6(5)). The base material 2, the first electrode 3, the second electrode 4, and the wiring line 6 are the same as those of the sensor 1A of the first embodiment. The wiring line 6 is connected to a measurement unit 10 (not illustrated) as in the first embodiment. Therefore, description of these configurations is omitted. In FIG. 6, the electrostatic shielding member 5C is shaded in gray for convenience.

In the present embodiment, the electrostatic shielding member 5C is configured as a single member made of a conductor similar to those of the first electrode 3 and the second electrode 4. The material of the electrostatic shielding member 5B may be the same as or different from the material of the first electrode 3 and second electrode 4.

In the present embodiment, the electrostatic shielding member 5C is formed in a frame plate shape, for example, a square frame plate shape having an opening hole 5Ca penetrating in the thickness direction in the center. As illustrated in FIG. 7, the electrostatic shielding member 5C is arranged inside the base material 2 in a posture parallel to the front and back surfaces 2a and 2b of the base material 2 (posture orthogonal to the Z-axis direction) at a Z-axis direction position close to the Z-axis direction positions of the second electrode 4 and the internal wiring line 6(5)in between the first electrodes 3(1) to 3(4) and the second electrode 4. Further, the electrostatic shielding member 5C is grounded in a grounding place outside the base material 2 via a grounding wiring line 7C.

More specifically, the electrostatic shielding member 5C is arranged such that the entire second electrode 4 is accommodated inside the opening hole 5Ca when viewed in the Z-axis direction. Therefore, the electrostatic shielding member 5C is arranged so as to surround the entire periphery of the second electrode 4 and not to have a portion overlapping with the second electrode 4 when viewed in the Z-axis direction. Further, the electrostatic shielding member 5C is arranged such that a portion around the opening hole 5Ca overlaps with a portion of each of the first electrodes 3(1) to 3(4) (a portion protruding outward from the second electrode 4).

More specifically, for example, the opening hole 5Ca is formed in a square shape similar to the second electrode 4 when viewed in the Z-axis direction. When viewed in the Z-axis direction, the electrostatic shielding member 5C is arranged such that two sides parallel to each other among the four sides of the opening hole 5Ca and the other two sides extend in the X-axis direction and the Y-axis direction, respectively, and the entire second electrode 4 is located inside the opening hole 5Ca.

The size of the opening hole 5Ba of the electrostatic shielding member 5B is set such that, when viewed in the Z-axis direction, the entire second electrode 4 is accommodated inside the opening hole 5Ca and, in a state where the electrostatic shielding member 5C is arranged as described above, the four sides of the opening hole 5Ca is close to the four corresponding sides of the second electrode 4. That is, the opening hole 5Ca of the electrostatic shielding member 5B is formed in a square shape having a size slightly larger than that of the second electrode 4.

As illustrated in FIG. 6, a portion around the opening hole 5Ca of the electrostatic shielding member 5C (square frame plate-like portion) is arranged so as to overlap with substantially the entire part of the internal wiring lines 6(1)in to 6(4)in respectively connected to the first electrodes 3(1) to 3(4) and the internal wiring line 6(5)in connected to the second electrode 4 when viewed in the Z-axis direction.

The electrostatic shielding member 5C is arranged at a Z-axis direction position close to the Z-axis direction positions of the second electrode 4 and the internal wiring line 6(5)in. Therefore, even if the base material 2 is elastically deformed due to an external force such as a shearing force, the electrostatic shielding member 5C moves relative to the first electrodes 3(1) to 3(4) and the internal wiring lines 6(1)in to 6(4)in substantially integrally with the second electrode 4 and the internal wiring lines 6(5)in. Therefore, the electrostatic shielding between each of the internal wiring lines 6(1)in to 6(4)in and each of the second electrode 4 and the internal wiring line 6(5) and the electrostatic shielding between the internal wiring line 6(5) and each of the first electrodes 3(1) to 3(4) can be appropriately realized by the electrostatic shielding member 5C regardless of the elastic deformation of the base material 2 due to the external force.

The grounding wiring line 7C connected to the electrostatic shielding member 5C is formed of a conductor in the same form as the grounding wiring lines 7 (7(1) to 7(6)) of the first embodiment. The grounding wiring line 7C is drawn out from the outer periphery of the electrostatic shielding member 5C to the outside of the base material 2 through the inside of the base material 2 (the inside of the periphery of the electrostatic shielding member 5C), and is connected to a grounding place outside the base material 2.

For example, the electrostatic shielding member 5C may be arranged such that the whole or a part of its outer periphery is exposed to the outside of the base material 2. The grounding wiring line 7C may extend from a portion of the electrostatic shielding member 5C exposed to the outside of the base material 2 without passing through the inside of the base material 2.

The sensor 1C of the present embodiment is configured as described above. The sensor 1C thus configured can be fabricated, for example, by a method similar to the fabrication method described for the sensor 1A of the first embodiment.

According to the sensor 1C of the present embodiment, the electrostatic shielding member 5C is arranged as described above. Therefore, the capacitance between each of the internal wiring lines 6(1)in to 6(4)in respectively connected to the first electrodes 3(1) to 3(4) and each of the second electrode 4 and the internal wiring line 6(5)in connected thereto, and the capacitance between the internal wiring line 6(5)in connected to the second electrode 4 and each of the first electrodes 3(1) to 3(4) can be maintained at sufficiently minute capacitance values (≈0) smaller than the predetermined threshold value by the electrostatic shielding member 5C regardless of the elastic deformation of the base material 2.

The electrostatic shielding member 5C is arranged so as not to be present in a place where each of the first electrodes 3(1) to 3(4) overlaps with the second electrode 4 when viewed in the Z-axis direction. Therefore, the electrostatic shielding member 5C is prevented from affecting the capacitance between each of the first electrodes 3(1) to 3(4) and the second electrode 4.

Therefore, according to the sensor 1C, similarly to the sensor 1A of the first embodiment, the capacitance between each of the first electrodes 3(1) to 3(4) and the second electrode 4 can be accurately measured by the measurement unit 10. As a result, the amount of elastic deformation of the base material 2 due to an external force (shear force, load applied in Z-axis direction) acting on the base material 2 and the external force can be accurately measured from the measurement values of the capacitance.

In the sensor 1C of the third embodiment described above, the electrostatic capacitance between the internal wiring line 6(3)in connected to the first electrode 3(3) and each of the second electrode 4 and the internal wiring line 6(5) connected thereto is sufficiently minute (≈0). Therefore, the electrostatic shielding member 5C may be, for example, a member that does not include a portion extending in the Y-axis direction close to the first electrode 3(3).

The electrostatic shielding member 5C may be divided into, for example, a plurality of portions. The electrostatic shielding member 5C may be fixed to the second electrode 4 via an appropriate insulator outside the base material 2, for example. In this case, the Z-axis direction position of the electrostatic shielding member 5C may not be close to the Z-axis direction positions of the second electrode 4 and the internal wiring line 6(5)in. For example, the Z-axis direction position of the electrostatic shielding member 5C may be a central position between the first electrodes 3(1) to 3(4) and the second electrode 4, a Z-axis direction position close to the first electrodes 3(1) to 3(4), or the like.

Other Embodiments

The present invention is not limited to the first to third embodiments described above, and other embodiments can be adopted. For example, in the sensors 1A, 1B, and 1C of the first to third embodiments, the second electrode 4 is a single electrode, but the second electrode 4 may be divided into a plurality of electrodes.

In the sensors 1A, 1B, and 1C of the first to third embodiments, the first electrode 3 includes four electrodes, and the second electrode 4 includes a single electrode. However, conversely, the first electrode may include a single electrode, and the second electrode may include four electrodes, for example.

In the sensors 1A, 1B, and 1C of the first to third embodiments, the first electrodes 3 (3(1) to 3(4)) are arranged on the front surface 2a side of the base material 2, and the second electrode 4 is arranged on the back surface 2b side of the base material 2. However, conversely, the first electrodes 3 (3(1) to 3(4)) may be arranged on the back surface 2b side of the base material 2, and the first electrode 4 may be arranged on the front surface 2a side of the base material 2.

In the sensors 1A, 1B, and 1C of the first to third embodiments, the sensors 1A to 1C are configured to be capable of measuring the shear force in two axial directions of the X-axis direction and the Y-axis direction and the load in the Z-axis direction. However, for example, the sensors may be configured to be capable of measuring the shear force in one axial direction and the load in the Z-axis direction. Alternatively, for example, the sensors may be configured to be capable of measuring only the load in the Z-axis direction.

For example, removing the first electrodes 3(2) and 3(4) aligned in the Y-axis direction and the wiring lines 6(2) and 6(4) connected thereto from the sensors 1A to 1C makes it possible to form sensors capable of measuring the shear force in the X-axis direction and the load in the Z-axis direction. In this case, the electrostatic shielding member may include, for example, the electrostatic shielding member 5(1) of the sensor 1A, the electrostatic shielding member 5B of the sensor 1B, the electrostatic shielding member 5C of the sensor 1C, or a portion of the electrostatic shielding member 5B or 5C extending in the Y-axis direction close to the first electrode 3(1).

In addition, for example, arranging a plate-shaped first electrode having an area smaller than that of the second electrode 4 so as to face the central portion of the second electrode 4 in the Z-axis direction makes it possible to form a sensor capable of measuring only the load in the Z-axis direction. In this case, the electrostatic shielding member may be arranged, for example, at a Z-axis direction position close to a Z-axis direction position of the wiring line connected to the first electrode (wiring line inside the base material 2) along the wiring line.

What is claimed is:

1. A capacitance sensor comprising:
    an elastically deformable base material formed of a dielectric;
    at least one first electrode arranged in contact with the base material;
    at least one second electrode that is in contact with the base material, is arranged to be separated from the first electrode in a thickness direction of the base material in a state where the base material is interposed between the first electrode and the second electrode, and is arranged to have a portion overlapping with the first electrode when viewed in a direction of spacing from the first electrode; and
    a first electrode-side wiring line and a second electrode-side wiring line connected to the first electrode and the second electrode, respectively, wherein
    a grounded electrostatic shielding member is arranged in at least one or more of a place between a first wiring portion of the first electrode-side wiring line that moves relative to the second electrode together with the first electrode as the base material elastically deforms and the second electrode, a place between a second wiring portion of the second electrode-side wiring line that moves relative to the first electrode together with the second electrode as the base material elastically deforms and the first wiring portion, and a place between the second wiring portion and the first electrode,
    the grounded electrostatic shielding member is plate shaped,
    the grounded electrostatic shielding member is provided inside the base material,
    the grounded electrostatic shielding member is arranged between the first electrode and the second electrode in a thickness direction of the base material, and
    the grounded electrostatic shielding member is arranged in at least one or more of a place between a first wiring portion of the first electrode-side wiring line that moves relative to the second electrode together with the first electrode as the base material elastically deforms and the second electrode, a place between a second wiring portion of the second electrode-side wiring line that moves relative to the first electrode together with the second electrode as the base material elastically deforms and the first wiring portion, and a place between the second wiring portion and the first electrode, and a place between the second wiring portion and the first wiring portion.

2. The capacitance sensor according to claim 1, wherein the electrostatic shielding member is arranged so as to extend over a plurality of places among the place between the first wiring portion and the second electrode, the place between the second wiring portion and the first wiring portion and the place between the second wiring portion and the first electrode.

3. The capacitance sensor according to claim 1, wherein the electrostatic shielding member is arranged so as not to be present in a place where the first electrode and the second electrode overlap with each other when viewed in the direction of spacing between the first electrode and the second electrode.

4. The capacitance sensor according to claim 1, wherein the electrostatic shielding member is arranged at a position closer to the first electrode in the direction of spacing between the first electrode and the second electrode so as to move relative to the second electrode together with the first electrode as the base material elastically deforms, and is arranged so as to surround a periphery of the first electrode and not to have a portion overlapping with the first electrode when viewed in the direction of spacing between the first electrode and the second electrode.

5. The capacitance sensor according to claim 1, wherein the electrostatic shielding member is arranged at a position closer to the second electrode in the direction of spacing between the first electrode and the second electrode so as to move relative to the first electrode together with the second electrode as the base material elastically deforms, and is arranged so as to surround a periphery of the second electrode and not to have a portion overlapping with the second electrode when viewed in the direction of spacing between the first electrode and the second electrode.

* * * * *